(12) United States Patent
Cieslinski

(10) Patent No.: US 8,564,705 B2
(45) Date of Patent: Oct. 22, 2013

(54) IMAGE SENSOR WITH A PLURALITY OF SWITCHABLE ROWS OF COLUMN AMPLIFIERS

(75) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 76 days.

(21) Appl. No.: 13/294,464

(22) Filed: Nov. 11, 2011

(65) Prior Publication Data

US 2012/0119065 A1    May 17, 2012

(30) Foreign Application Priority Data

Nov. 15, 2010 (DE) .......................... 10 2010 051 438

(51) Int. Cl.
*H04N 3/14* (2006.01)
*H04N 5/335* (2011.01)

(52) U.S. Cl.
USPC ............................ 348/302; 348/300; 348/321

(58) Field of Classification Search
USPC ............... 348/222.1, 301, 321, 323, 300, 302
See application file for complete search history.

(56) References Cited

U.S. PATENT DOCUMENTS

| | | | |
|---|---|---|---|
| 5,060,245 A | 10/1991 | Nelson | |
| 5,896,172 A | 4/1999 | Korthout et al. | |
| 6,822,213 B2 * | 11/2004 | Stark | 250/208.1 |
| 7,244,921 B2 | 7/2007 | Mabuchi | |
| 7,342,212 B2 * | 3/2008 | Mentzer et al. | 250/208.1 |
| 7,538,304 B2 | 5/2009 | Ladd | |
| 7,565,033 B2 | 7/2009 | Hanson et al. | |
| 7,948,540 B2 | 5/2011 | Ogura et al. | |
| 2006/0092288 A1 * | 5/2006 | Hara et al. | 348/222.1 |
| 2006/0268137 A1 | 11/2006 | Myers | |
| 2008/0258042 A1 * | 10/2008 | Krymski | 250/208.1 |
| 2008/0309809 A1 | 12/2008 | Cieslinski | |

(Continued)

FOREIGN PATENT DOCUMENTS

| | | |
|---|---|---|
| DE | 44 96 504 T5 | 3/1995 |
| DE | 103 12 377 A1 | 10/2003 |

(Continued)

OTHER PUBLICATIONS

Translation of European Search Report dated Dec. 11, 2012 relating to EP Application No. 11 009 042.0.

(Continued)

*Primary Examiner* — Gevell Selby
(74) *Attorney, Agent, or Firm* — Gifford, Krass, Sprinkle, Anderson & Citkowski, P.C.

(57) ABSTRACT

An image sensor for electronic cameras has an image field having at least one image field block which includes a plurality of light sensitive pixels arranged in rows and columns for generating exposure dependent pixel signals, wherein the pixel signals of the pixels of the respective column of the respective image field block can be read out via one or more respective column lines extending parallel to one another. The image sensor has at least one first row of column amplifiers and at least one second row of column amplifiers for the respective image field block. The image sensor is adapted to read out the pixel signals of the pixels of the respective column of the respective image field block of an image or of two mutually following images partly via the at least one first row and partly via the at least one second row of column amplifiers (25).

30 Claims, 8 Drawing Sheets

(56) References Cited

U.S. PATENT DOCUMENTS

| | | |
|---|---|---|
| 2009/0146196 A1 | 6/2009 | Cieslinski |
| 2009/0147089 A1 | 6/2009 | Tonkikh |
| 2010/0073538 A1* | 3/2010 | Cieslinski .................... 348/301 |
| 2010/0110251 A1 | 5/2010 | Cieslinski |

FOREIGN PATENT DOCUMENTS

| | | |
|---|---|---|
| DE | 696 34 833 T2 | 6/2005 |
| DE | 10 2007 027 463 A1 | 12/2008 |
| DE | 10 2007 058 973 A1 | 6/2009 |
| DE | 10 2008 052 916 A1 | 4/2010 |
| EP | 1 389 740 A1 | 2/2004 |
| WO | WO-99/16238 | 4/1999 |

OTHER PUBLICATIONS

German Search Report dated Jul. 11, 2011 relating to DE No. 10 2010 051 438.1.

Artyomov, Evgeny; Yadid-Pecht: Adaptive Multiple-Resolution CMOS Active Pixel Sensor. In: Circuits and Systems I: Regular Papers, IEEE Transactions on, 53, Oct. 2006, 10, pp. 2178-2186.-ISSN 1549-8328.

U.S. Appl. No. 13/294,419, filed Nov. 11, 2011.

* cited by examiner

IMAGE SENSOR WITH A PLURALITY OF SWITCHABLE ROWS OF COLUMN AMPLIFIERS

CROSS-REFERENCE TO RELATED APPLICATIONS

This application claims priority of German Patent Application DE 10 2010 051 438.1 filed Nov. 15, 2010.

FIELD OF THE INVENTION

The present invention relates to an image sensor, in particular to a CMOS image sensor, for electronic cameras, in particular electronic motion picture cameras or movie cameras, having an image field, in particular having at least one image field block, in particular two image field blocks, said image field including a plurality of light sensitive pixels arranged in rows and columns for generating exposure dependent pixel signals, wherein the pixel signals of the pixels of the respective column of in particular the respective image field block can be read out via one or more column lines respectively extending parallel to one another. The present invention further relates to a corresponding method.

BACKGROUND OF THE INVENTION

In electronic cameras, the light-sensitive elements or pixels convert light incident through an objective of the camera into electric signals. Each of the pixels is addressed to read out an image, with a pixel corresponding to a picture element of the image. A signal which is proportional to a charge of the pixel collected by an exposure is conducted to an output of the image sensor.

Image sensors are in particular known which have a separate row selection line for each row and a separate column line for each column. The reading out of such an image sensor takes place row-wise, i.e. row for row. For this purpose, the pixels of the respective row are switched to the column lines by means of the respective row selection line. A separate column amplifier is associated with each of the column lines to amplify the signals of the pixels of the selected row applied at the column lines. The column amplifiers are in this respect arranged in a row located beneath or above the image field. The amplified signals are conducted via a multiplexer device to the output or—if a plurality of outputs are provided, as is preferred to achieve a high picture rate—to the outputs of the image sensor.

The pixels of the image field are further reduced in size again and again with each new technology generation to increase the resolution of the image sensors. Since the aforesaid column amplifiers usually have approximately the same width as the pixels, the width of the column amplifiers also has to reduce accordingly with the ever smaller pixels.

If this is not possible or is disadvantageous, an image sensor in accordance with FIG. 1 can be equipped with at least one row 21 of column amplifiers 25, in particular two or more such rows 21 arranged at a first side of the image field 11, and with at least one such row 23, in particular two or more such rows 23, arranged at a second side of the image field, with the image field 11 having the pixels 13 being arranged between the first row 21 and the second row 23. The column amplifiers 25 can then be arranged in the row 21 above the image field 11 and in the row 23 beneath the image field 11, and the column lines 17 can then alternately be conducted upwardly and downwardly to the respective row 21, 23 of column amplifiers 25. In such an arrangement, the width of the column amplifiers 24 can be twice as large as the width of the pixels 13. A line addressing logic 19 is also shown in FIG. 1.

In an image sensor which has a plurality of column lines which extend parallel to one another for the respective column, for example two or four column lines, to achieve a higher read-out speed, a corresponding increase in the maximum possible width of the column amplifiers can be achieved.

To achieve a high dynamic range with the image sensor, the pixels and column amplifiers are designed as extremely low-noise and thus, however, also as particularly sensitive. A small signal aliasing or signal difference thereby already results in an aliased or differing brightness of the picture element corresponding to the respective amplified signal. Such interference or such a difference is, however, not perceptible to the eye provided it occurs randomly or only pointwise.

If the signal aliasing or signal difference is, however, caused systematically by one of the column amplifiers, the interference or difference occurs in all pixels of the column of the image sensor associated with the respective column amplifier and thus in all picture elements of the corresponding column of the image so that a vertical stripe arises in the image which can be perceived by the eye. A vertical stripe can arise independently of whether one or more rows of column amplifiers is/are provided or whether, with a plurality of rows, they are arranged on the same side or—distributed in whatever manner—are arranged at different sides of the image field.

In an image sensor having the explained two rows of column amplifiers, the electric properties of the column amplifiers of the upper row such as offset voltage and amplification as a rule differ at least slightly from the column amplifiers of the lower row. This difference is caused by the fact that the named properties of the column amplifiers are dependent on different influencing variables such as temperature, voltage supply and production tolerances and thus have a relatively high location dependency. Such differences are in this respect the greater, the further away the column amplifiers are from one another, i.e. the amplified signals of the upper row of column amplifiers, on the one hand, and the amplified signals of the lower row of signal amplifiers, on the other hand, will systematically differ from one another. This difference becomes visible as a different brightness in the image. If the image of the one row of column amplifiers is now shown brighter, all odd columns are brighter than all even columns, or vice versa. This results in vertical brightness stripes or in a stripe pattern in the image.

In image sensors which are designed as color sensors, i.e. for example, are provided with a color filter arrangement with a Bayer pattern, blue-sensitive pixels and red-sensitive pixels lie alternately next to one another in adjacent columns. With a color sensor, the aforesaid stripe pattern therefore results in corresponding color differences in the image.

SUMMARY OF THE INVENTION

It is the underlying object of the invention to provide an image sensor of the initially named kind in which a stripe pattern or a vertical stripe does not arise or in which at least the perceptibility of a stripe pattern or of a vertical stripe is reduced.

This object is satisfied by an image sensor having the features of claim 1, and in particular in that at least one first row of column amplifiers and at least one second row of column amplifiers are in particular provided for the respective image field block and the image sensor is adapted to read out the pixel signals of the pixels of the respective column of in particular the respective image block of an image or of two mutually following images partly via the at least one first row and partly via the at least one second row of column amplifiers.

It can be preferred if the at least one first row of column amplifiers and one second row of column amplifiers include at least one, in particular precisely one or precisely two, rows of column amplifiers arranged at a first side of the image field and at least one row, in particular precisely one or two rows, of column amplifiers arranged at a second side of the image field.

It is therefore possible in accordance with the invention to use the first row and the second row for reading out the pixel signals of the pixels of the respective column of in particular the respective image field block. The pixel signals of the pixels of the respective column of in particular the respective image field block of an image or of two mutually following images therefore do not all have to be amplified by the same row of column amplifiers or not by a column amplifier from only one row of column amplifiers. It can hereby be achieved that the differences caused by a column amplifier of a row no longer relate to the total "column" of an image or to the part of the "column" of an image associated with the respective image field block (but only a portion of the pixels of the respective column of in particular the respective image field block, since the other portion of the pixels of the respective column of in particular the respective image field block is read out by a column amplifier of the other row) or the aforesaid stripe in particular arises in the respective image field block at most in one of the two mutually following images.

With an image sensor which includes two column lines per column, two image lines can be read out simultaneously. The number of column amplifiers of the first row and/or the number of column amplifiers of the second row in particular correspond/corresponds to the number of pixels of a row, i.e. the number of column amplifiers of the two rows is twice as large as the number of pixels of a row. It is advantageous in this case to select or fixedly to predefine from the two column lines which are associated with a respective column one column line for a processing in the first row and one column line for a processing in the second row. An image sensor can, however, also include more than two column lines per column, for example four column lines per column.

If the image field only includes one image field block, it can be preferred if the image field is arranged between the first row and the second row and/or in each case precisely one row of column amplifiers is arranged at the first side of the image field and at the second side of the image field. If the image field includes a plurality of image field blocks, in particular two image field blocks, it is preferred if the first row and the second row of the respective image field block are arranged at the same side of the image field. The image field blocks can engage into one another in the manner of fingers. A respective image field block is in particular given by a respective group of contiguous pixels which can be read out via column lines continuous and/or interrupted in the region of the respective image field block over at least one of the two sides of the image field. The respective image field block in particular extends over all columns and/or from the first column to the last column.

Generally, more than two rows of column amplifiers can also be provided for a respective image field block and/or for a respective image field side. The image sensor is then adapted to read out the pixel signals of the pixels of the respective column of in particular the respective image field block of one or two mutually following images in each case partly via each of the rows.

In accordance with an embodiment of the invention, a switching device is provided which is adapted to switch the respective column line selectively to one of the rows, in particular to the first row or to the second row, to read out the pixel signals of the pixels of the respective column of in particular the respective image field block, with additionally a control device being provided for controlling the switching device. It is hereby in particular possible to switch the pixel signals of the pixels of a column of on particular the respective image field block of an image, which are simultaneously applied at the column line or lines of the respective column of in particular the respective image field block, either to a column amplifier of the first row or to a column amplifier of the second row.

A dot pattern can therefore be generated instead of a stripe pattern. A "scrambling" of the vertical interference or differences is thus possible. Since the human eye can by no means recognize a dot pattern as easily as a stripe pattern with the same difference of the column amplifiers of the two rows— the recognizability of a dot patterns is approximately only a fifth of the recognizability of a linear pattern—the subjective image quality can be substantially improved. A vertical stripe can also hereby be scrambled.

The control device can in particular be adapted to control the switching device such that the connection association of the column lines to the in particular two rows varies from one line to the next line or from line to line, in particular randomly or quasi-randomly. The distribution of the pixels of a column of in particular the respective image field block to the rows, in particular to the first row and to the second row, is in this respect preferably realized or selected such that no regular pattern arises.

Generally, a plurality of possible connection associations of the column lines to the in particular two rows can be predefined from which the connection association for the respective pixel row is selected. The selected connection association can then be varied from one pixel row to the next pixel row or from pixel row to pixel row. It is, however, also possible that the respective connection association is generated by a random generator.

The column lines can be divided into a plurality of column line groups, in particular column line pairs, with the respective column line group including a plurality of column lines, in particular two column lines, in particular arranged next to one another, with each of the column lines of the respective column line group being switchable to each of the rows of column amplifiers, in particular to the first row and to the second row, and with the control device being adapted to control the switching device such that each of the column lines of the respective column line group is switched to a separate one of the rows of column amplifiers, in particular switching one of the two column lines of a respective column line pair to the first row and the other of the two column lines of the respective column line pair to the second row. The in particular two column lines of the respective column line group, in particular of the respective column line pair, can in particular be two signal lines of a respective column or in particular two column lines of in particular two different respective columns.

For this purpose, the switching device can include, per column group, in particular per column line pair, a first changeover switch arranged between the image field and the first row and a second changeover switch arranged between the image field and the second row or an intermediate switch arranged between the image field and the in particular two rows arranged at the same side of the image field. The pixel signals applied to the in particular two column lines of the respective column line groups can be forwarded unchanged in parallel or be swapped over in a crossover manner by an intermediate switch.

A separate column amplifier from each of the rows, in particular a separate column amplifier from the first row and a separate column amplifier from the second row of column amplifiers are preferably associated with the respective column line group, in particular with the respective column line pair.

The column lines can be divided into a plurality of column line units, with the respective column line unit including a plurality of column lines or column line groups, in particular column line pairs, in particular arranged next to one another. The connection association of the column lines to the in particular two rows present within a column line unit is preferably identical for the plurality of column line units. The control device can in particular then include a plurality of column lines in this case, with the respective control line being associated with a respective column line or with a respective column line group, in particular with a respective column line pair, from each column line unit. The switching device and/or the control device or the control of the switching device can hereby be simplified.

Alternatively or additionally, the control device is adapted to control the switching device such that the connection association of the column lines to the in particular two rows varies from one image to the next image or from image to image. It is generally possible in this respect that the respective column, or the portion of the column associated with the respective image field block, is only read out via one of the in particular two rows so that the aforesaid stripe pattern or the aforesaid vertical stripe can still be present in an image. If the stripe pattern or the vertical stripe is changed, for example inverted, for the next image or from image to image, the same mean brightness is present—averaged over time—for all columns or portions hereof so that differences in the properties of the column amplifiers of the in particular two rows from one another are not perceived. For example, the even columns or the portions hereof can be read out by the first row and the odd columns or the portions hereof can be read out by the second row, or vice versa, for one image and this association can be exactly reversed for the next image. The pixel signals of the respective column, or of the portion hereof, of two mutually following images are therefore partly read out (namely the pixel signals of the respective column, or of the portion hereof, of the first of the two images) via the first row and partly (namely the pixel signals of the respective column, or of the portion hereof, of the second of the two images) are read pout via the second row. The variation from one image to the next or from image to image can, however, also be combined with the aforesaid scrambling within an image, as is preferred, so that the perceptibility of the differences of the column amplifiers of one row, in particular of the first row, of the column amplifiers from another row, in particular from the second row, is particularly small.

In accordance with another embodiment of the invention, the connection association of the column lines to the in particular two rows is fixedly predefined in a plurality of column lines of a respective column, with in particular the pixels of the respective column being associated randomly, quasi-randomly or alternately with the rows, in particular with the first row and the second row. The fixed predefinition can, for example, be realized by a fixed wiring. The aforesaid scrambling can also hereby be achieved. The aforesaid switching device or the aforesaid control device is not necessary in this case.

The column lines are in this respect in particular divided into a plurality of column line groups, in particular column line pairs, with the in particular two column lines of the respective column line group in particular being two column lines of a respective column, and with the connection association of the column lines to the in particular two rows varying, in particular being inverted, from one column line group to the next column line ground or from column line group to column line group and/or from one column to the next column or from column to column.

The number of column amplifiers preferably corresponds to the number of column lines. All the pixels of a row can hereby be read out of the image field simultaneously. It is, however, generally also possible that fewer column amplifiers are provided than columns or column lines or that a respective column amplifier is associated with a plurality of columns or column lines. It is moreover preferred if the number of column amplifiers in the rows is identical for the rows, in particular the number of column amplifiers in the first row corresponds to the number of column amplifiers in the second row. The width of the column amplifiers can be maximized on the basis of this equal distribution with a given width of the image field.

The respective pixel of the respective column, in particular of the respective image field block, is in particular only connected or connectable to one of the plurality of column lines in an image sensor which has a plurality of column lines extending parallel to one another for the respective column of in particular the respective image field block.

If one column line in the image sensor fails due to a defect, it is preferred if the pixel values of the pixels associated with the respective failed column line can be interpolated from the pixel values of respective adjacent pixels. It is in particular therefore preferred if directly mutually following pixels in a respective column of in particular a respective image field block are pairwise alternately connected or connectable to the plurality of column lines. With a color sensor, for example with a Bayer pattern, it can hereby be achieved that, on the failure of a column line, one color (e.g. red or blue) is not missing for the total respective column or for the portion hereof. The interpolation of the pixel values of the failed pixels can hereby be simplified.

The present invention in particular relates to an image sensor, in particular to a CMOS image sensor, for electronic cameras, having an image field which includes a plurality of light sensitive pixels arranged in rows and columns for generating exposure dependent pixel signals, wherein the pixel signals of the pixels of the respective column can be read out via one or more respective column lines extending parallel to one another, and having a first row of column amplifiers and a second row of column amplifiers, with the image field being arranged between the first row and the second row, with the image sensor being adapted to read out the pixel signals of the pixels of the respective column of one or two mutually following images partly via the first row and partly via the second row.

The invention furthermore relates to a method corresponding to the image sensor in accordance with the invention, in particular to a method for reading out an image sensor, in particular a CMOS sensor, for electronic cameras, wherein the image sensor has an image field in particular having at least one image field block which comprises a plurality of light sensitive pixels arranged in rows and columns for generating exposure dependent pixel signals, and has at least one first row of column amplifiers and a second row of column amplifiers, wherein the pixel signals of the pixels of the respective column of in particular the respective image field block are read out via one or more respective column lines extending in parallel to one another, and wherein the pixel signals of the pixels of the respective column of in particular the respective image field block of one or two mutually following images are read out partly via the first row and partly via the second row.

Preferred embodiments of the method in accordance with the invention result in an analog manner from the preferred embodiments of the image sensor in accordance with the invention.

BRIEF DESCRIPTION OF THE DRAWINGS

Non-restricting embodiments of the invention are shown in the drawing and will be described in the following.

There are shown, schematically in each case.

DETAILED DESCRIPTION OF THE PREFERRED EMBODIMENTS

Figure 1:
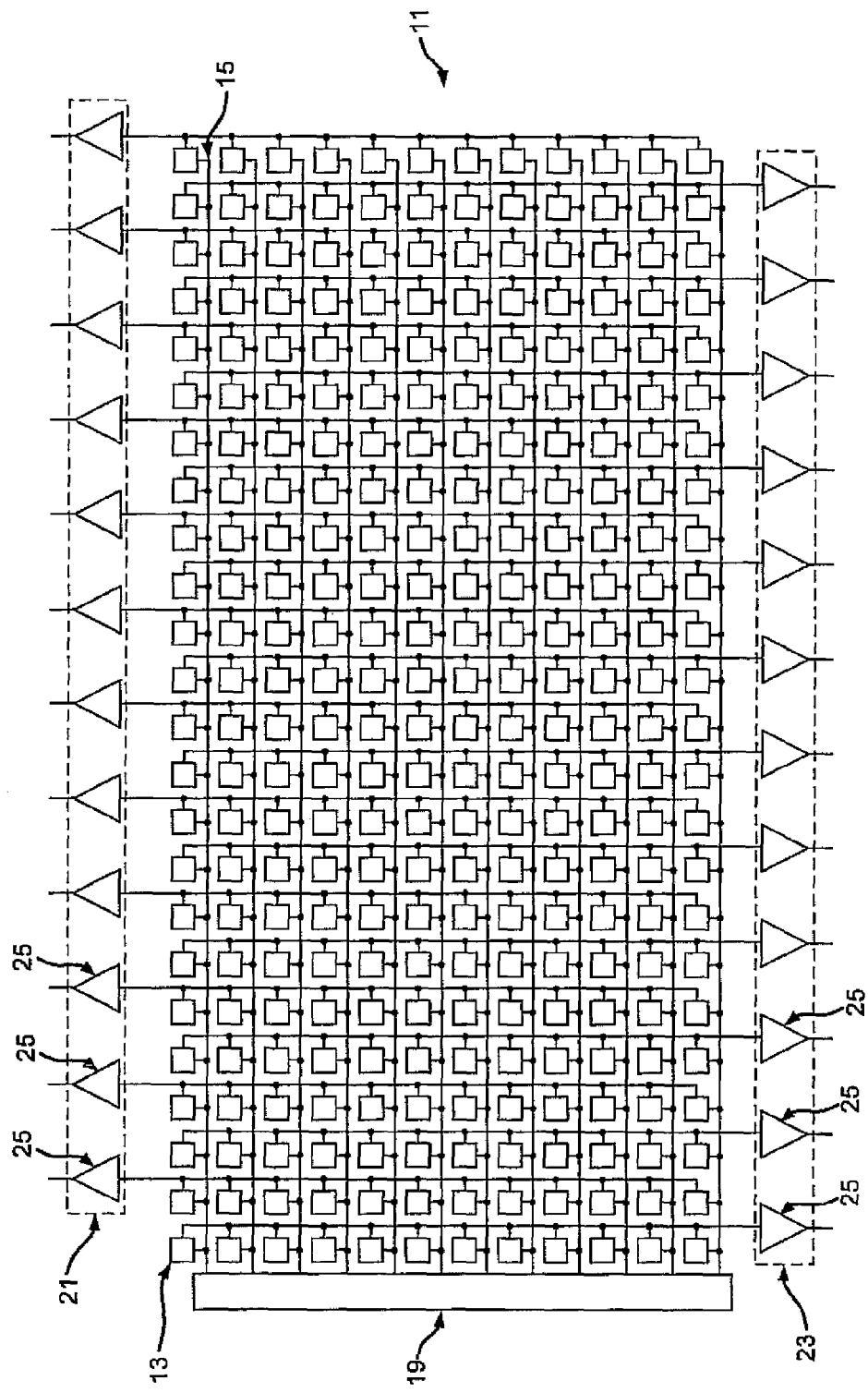
FIG. 1 an image sensor in accordance with a non-claimed embodiment.
Figure 2:
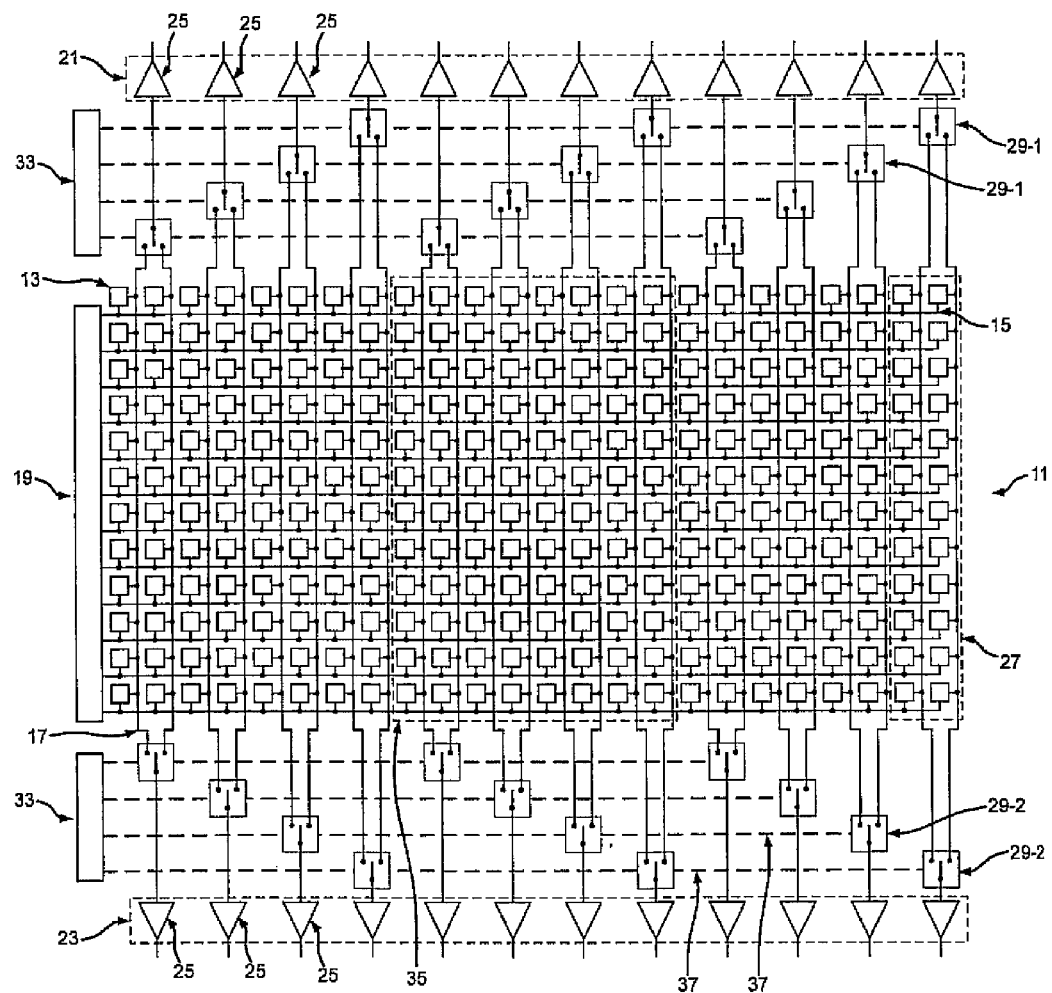
FIG. 2 an image sensor in accordance with a first embodiment in accordance with the invention.

The image sensor of an electronic motion picture camera shown in FIG. 2 includes an image field 11 which is formed from a plurality of pixels 13 which are arranged along rows and columns. The size of the image field is only selected by way of example. A separate row selection line 15 is provided for each row; a separate column line 17 for each column. The reading out of the image sensor takes place row-wise. For this purpose, the pixels 13 of the respective row are switched by means of the respective row selection line 15 to the respective column lines 17 continuing from the first to the last row. The image field 11 forms an image field block in the sense of the present application. A row addressing logic 19 is provided for addressing the row selection line 15 associated with the respective row to be read out.

A respective row 21, 23 of column amplifiers 25 is provided above and beneath the image field 11. The first row 21 and the second row 23 each extend parallel to the pixel rows of the image field 11. The column amplifiers 25 serve the purpose of amplifying the signals of the pixels 13 of the selected pixel row applied to the column lines 17. For this purpose, a sample and hold circuit, not shown, is connected before the respective column amplifier 25 and holds the output voltage of the respective pixel 11 to a constant value. The column amplifiers 25 are preferably differential amplifiers and a correlated double sampling takes place in operation, i.e. a reference signal is additionally read out beside the actual signal to suppress the thermal noise of the image sensor. The signals amplified by the column amplifiers 25 of the two rows 21, 23 are then conducted via a respective upper or lower multiplex device, not shown, to at least one upper and/or lower output, not shown, of the image sensor.

Two respective column lines 17 arranged next to one another form a column line pair 27, with each column line 17 being associated with only one column line pair 27. A separate column amplifier 25 from the first row 21 and a separate column amplifier 25 from the second TOW 23 are associated with each column line pair 27 so that the number of column amplifiers 25 overall corresponds to the number of column lines 17 and the number of column amplifiers 25 in the first row 21 corresponds to the number of column amplifiers 25 in the second row 23.

Furthermore, the image sensor includes a switching device which includes a plurality of changeover switches 29, with the number of changeover switches 29 corresponding to the number of column lines 17 or to the number of column amplifiers 25. A first changeover switch 29-1 and a second changeover switch 29-2 are in particular associated with each column line pair 27. The first changeover switch 29-1 is arranged between the two column lines 17 of the respective column line pair 27 and a respective column amplifier 25 of the first row 21. The second changeover switch 29-2 is arranged between the two column lines 17 of the respective column line pairs 27 and a respective column amplifier 25 of the second row 23. Each of the two column lines 17 of the respective column line pair 27 can be switched to the first row 21 and to the second row 23 via the first changeover switch 29-1 and via the second changeover switch 29-2.

Furthermore, a control device 33 is provided which is adapted to control the changeover switches 29 such that the one of the column lines 17 of the respective column line pair 27 is selectively switched to the first row 21 of column amplifiers 25 and the other of the two column lines 17 is switched to the second row 23 or the one of the two column lines 17 of the respective column line pair 27 is switched to the second row 23 and the other of the two column lines 17 is switched to the first row 21 to read out the two pixels 13 of the respective row of the respective column line pair 27.

It is therefore made possible via the changeover switches 29 to read out the pixels 13 of a column either via a column amplifier 25 of the upper row 21 or via a column amplifier 25 of the lower row 23, i.e. all pixels 13 of a column do not have to be read out via the same row 21 or 23. The pixels 13 of a column can, for example, be read out alternately or quasi-randomly upwardly and downwardly, i.e. the connection association of the column lines 17 to the two rows 21, 23 can be varied from pixel row to pixel row. The connection association used for the respective pixel row can be selected, for example, from a plurality of predefined connection associations.

A stripe pattern can hereby be avoided in an image taken by the image sensor which otherwise arises in that the properties (such as offset voltage and amplification) of the column amplifiers 25 of the first row 21 differ on average from those of the column amplifiers 25 of the second row 23. These differences between the rows 21 and 23 spaced relatively far from one another on the image sensor or chip can be caused e.g. by differences of one or more process parameters on the manufacture of the image sensor. Due to the distribution of the pixels 13 of a column over the upper row 21 and the lower row 23 on the reading out, a dot pattern is instead generated which cannot be perceived or is hardly perceptible to the human eye in comparison with a stripe pattern, which circumstance can be amplified if the dot pattern is varied from image to image.

To keep the activation or control of the changeover switches 29 as simple as possible, a plurality of column line pairs 27, e.g. 4, 8 or 16 column line pairs, are each combined to a respective column line unit 35. Which column line 17 is conducted upwardly to the first row 21 and which column line 17 is conducted downwardly to the second row 23 within a column line unit 35 is freely selectable for each column line pair 27. However, the same selection is used from column line unit 35 to column line unit 35. For this purpose, the control device 33 includes a plurality of control lines 37 which each control the first changeover switch 29-1 or the second changeover switch 29-2 associated with each column line unit 35.

In the following description of the further embodiments of the image sensor in accordance with the invention, respectively the same reference numerals are used for the same components or components of the same effect.

Figure 3:
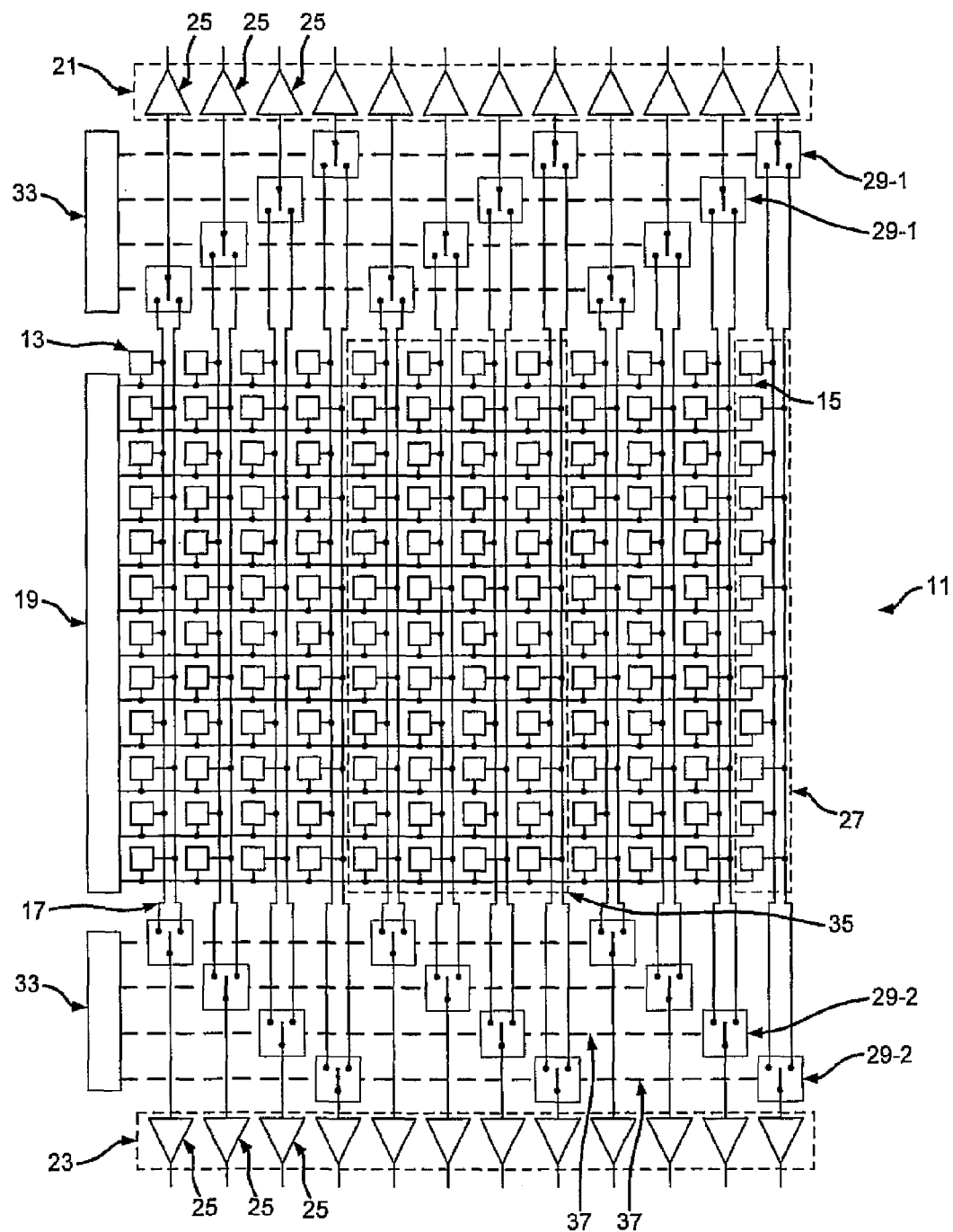
FIG. 3 an image sensor in accordance with a second embodiment in accordance with the invention.

The image sensor shown in FIG. 3 includes—instead of only one column line 17 per column—two column lines 17 per column which form a respective column line group 27 with which a respective changeover switch 29-1, 29-2 is associated. A column line unit 35 is in turn formed by four column line pairs 27 which, in contrast to the image sensor in accordance with FIG. 2, do not belong to eight columns, but only to four columns. Each pixel 13 is—as also in the image sensor shown in FIG. 2—connected or connectable to only one column line 17 (of the two column lines 17 of a column), with the pixels 13 in a respective column being alternately connected or connectable to the one and the other column line. An association pattern A-B-A-B A-B-A-B of directly mutually following pixels 13 of a respective column to the two respective column lines 17 is thus present (cyclically repeated association pattern "A-B"). With respect to the image sensor in accordance with FIG. 2, the image sensor in accordance with FIG. 3 has the advantage with an otherwise analog structure and an analog mode of operation that not only one row, but two rows can be read out simultaneously or together, whereby the read-out speed can be increased.

Unlike the illustration in accordance with FIG. 3, an even higher number of column lines 17 can also be provided per column of pixels 13, for example four column lines 17 per column. In this case, the four column lines 17 of each column form a respective column line group 27. The pixels 13 of each column can then be connected or connectable to a respective one of the four column lines 17 in accordance with the association scheme A-B-C-D A-B-C-D. The four column lines 17 of each column do not necessarily have to be used to read out four rows simultaneously. Instead, it is also possible to read out two rows simultaneously via a first pair of column lines 17 of the respective column line group 27 (in accordance with the control of the changeover switches 29 explained in connection with FIGS. 2 and 3) and simultaneously to prepare only the next read-out process at a further pair of column lines 17 of the respective column line group 27.

Figure 4:
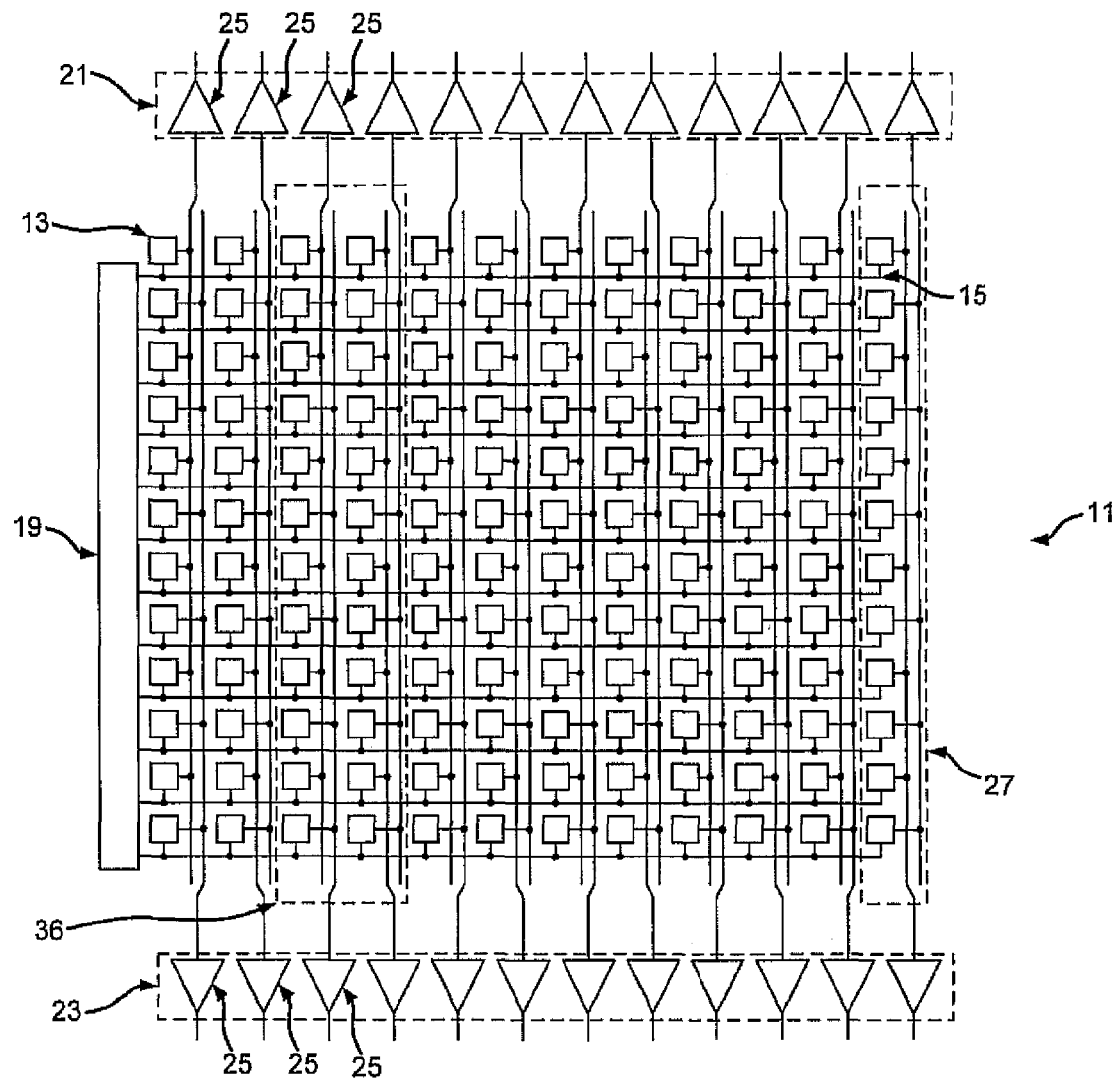
FIG. 4 an image sensor in accordance with a third embodiment in accordance with the invention.

The image sensor shown in FIG. 4 includes—as also the image sensor shown in FIG. 3—two column lines 17 per column. However, no changeover switches and no switching device are present, but rather a fixed wiring between the column lines 17 and the column amplifiers 25, with the one of the two column lines 17 of the respective column or of the respective column line pair 27 being connected to the first column amplifier row 21 and the other of the two column lines 17 of the respective column or of the respective column line pair 27 being connected to the second column amplifier row 23, i.e. a respective column line 17 (of the plurality of column lines) is only associated with one of the two rows 21, 23. Each pixel 13 is—as also in the image sensor shown in FIG. 3—connected only to one column line 17 (of the two column lines 17 of a column). The connection association of the column lines 17 to the two column amplifier rows 21, 23 is thus fixedly predefined. In the embodiment shown in FIG. 4, the pixels 13 of both one respective column and one respective row are alternatingly connected to the first row 21 and to the second row 23 so that an association of the pixels 13 of the image field 11 to the two rows 21, 23 in the manner of a chessboard pattern results. Generally, however, any other association, in particular different from column to column, is also possible. In contrast to the preceding embodiments, in the fixedly wired embodiment in accordance with FIG. 4, no variation of the association of the column lines 17 or of the pixels 13 to the two amplifier rows 21, 23 is possible. Nevertheless, analog to the preceding embodiments, the generation of a dot pattern instead of a stripe pattern is possible.

Figure 5:
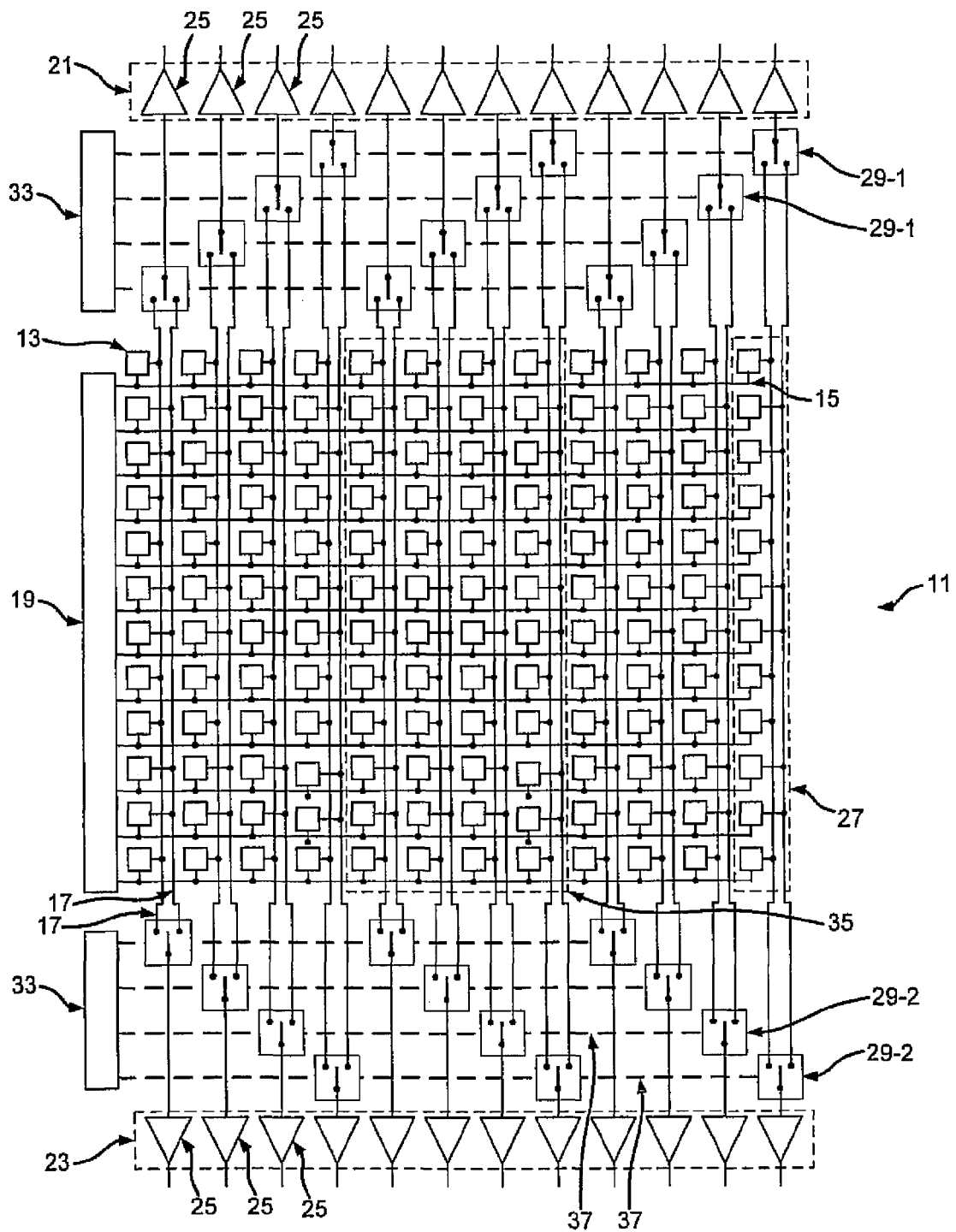
FIG. 5 an image sensor in accordance with a fourth embodiment in accordance with the invention.

An image sensor is shown in FIG. 5 which differs from the image sensor shown in FIG. 3 in that, in the respective column, the pixels 13 are connected pairwise alternately to the one and the other column line 17, i.e. an association scheme A-B-B-A A-B-B-A of directly mutually following pixels 13 of a respective column to the two respective column lines 17 is present (cyclically repeated association pattern "A-B-B-A"). With a color sensor having e.g. a Bayer pattern, i.e. with a color sensor which has specific color pixels, e.g. red and blue pixels, in each case only in every second row and in every second column, it can hereby be achieved on the failure of a column line 17 that a respective color (e.g. red or blue) is not missing for the total failed column, whereby an interpolation of the failed color values is simplified.

Figure 6:
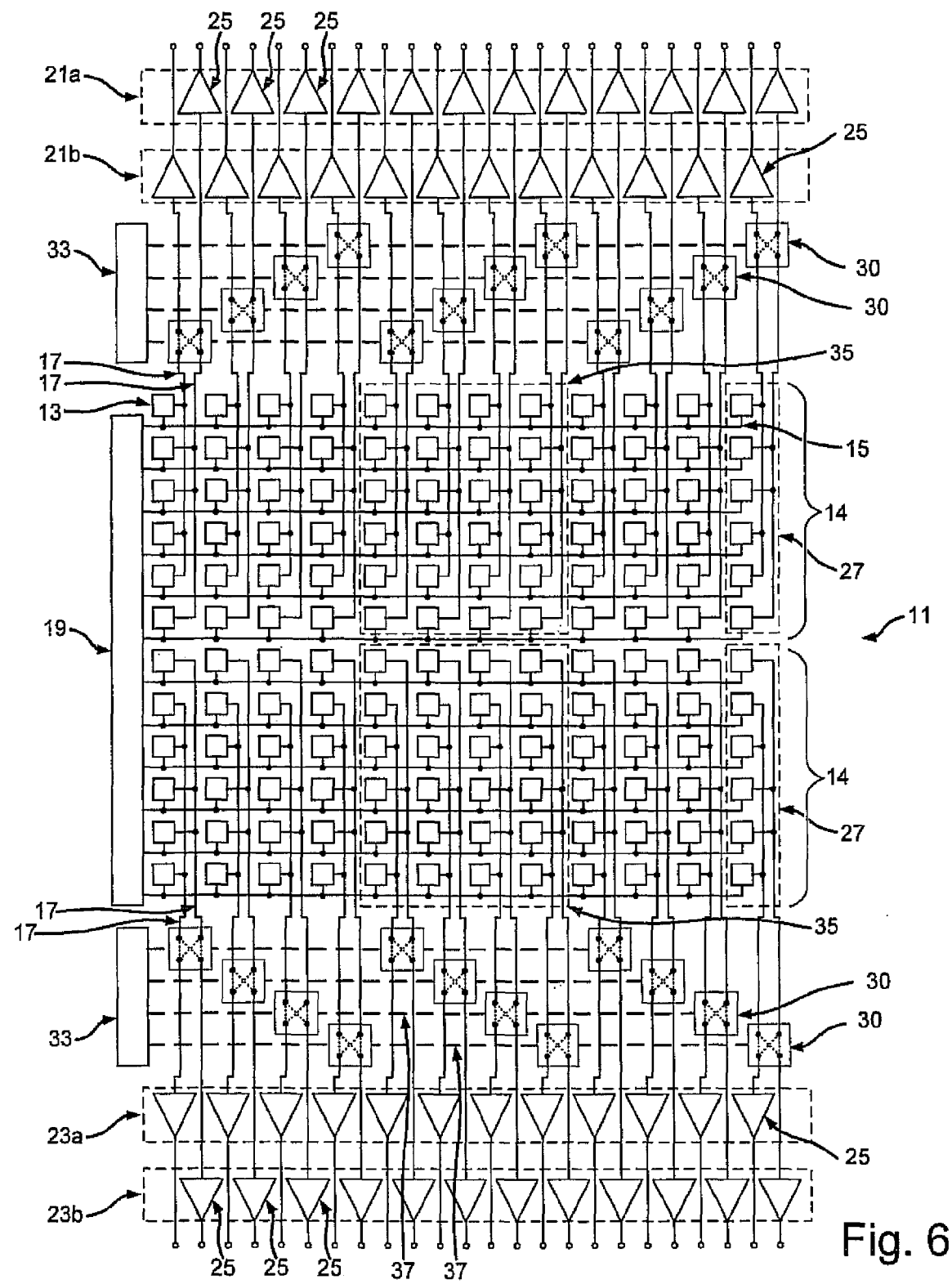
FIG. 6 an image sensor in accordance with a fifth embodiment in accordance with the invention.

In contrast to the image sensors in accordance with FIGS. 1 to 5, which each show an image field 11 which comprises a single image field block with continuous column lines 17, in the image sensor in accordance with FIG. 6, the image field 11 is divided into two image field blocks 14, in particular into two image field halves, or the column lines 17 of the columns are divided, in particular at the center of the image field 11. Two respective rows 21a, 21b, 23a, 23b of column amplifiers 25 are provided at a first (upper) side of the image field 11 and at a second (lower) side of the image field 11. The pixels 13 of a respective column are divided into a first (upper) pixel group and a second (lower) pixel group, with the pixels 13 of the respective first pixel group in a respective column being read out via common first column lines 17 via the rows 21a, 21b of column amplifiers 25 arranged at the first side of the image field 11 and the pixels 13 of the respective second pixel group being read out via common second column lines 17 via the rows 23a, 23b of column amplifiers 25 arranged at the second side of the image field 11. The pixels 13 of the first pixel groups of the columns define a first (upper) image field block 14 or a first (upper) image half; the pixels 13 of the second pixel groups of the columns define a second (lower) image field block 14 or a second (lower) image field half. Instead of changeover switches, intermediate switches 30 are arranged between the first image field block 14 and the two upper rows 21a, 21b and between the second image field block 14 and the two lower rows 23a, 23b and switch the one of the two column lines 17 of the column line pair 27 of the respective image field block 14 to the first row 21a or 23a respectively and the other of the two column lines 17 to the second row 21b or 23b respectively. An even higher frame rate or even higher read-out speed can be achieved with the image sensor in accordance with FIG. 6 with respect to the image sensor in accordance with FIG. 5 by the division of the image field 11 into two image field blocks 14 since now not only two, but four rows can be read out simultaneously or together.

Figure 7:
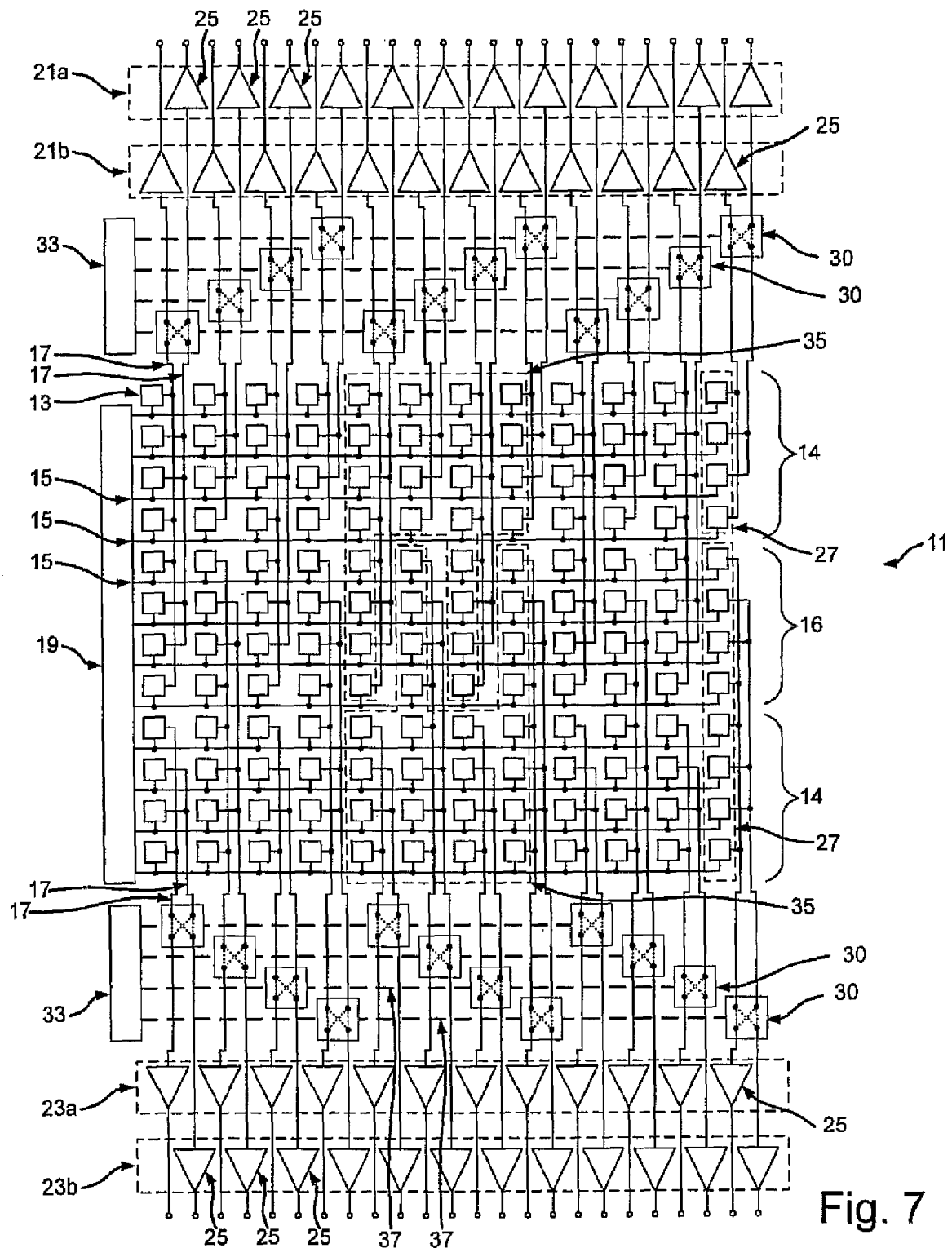
FIG. 7 an image sensor in accordance with a sixth embodiment in accordance with the invention.

An image sensor is shown in FIG. 7 which differs from the image sensor shown in FIG. 6 in that the division of the pixels 13 into the first pixel group and the second pixel group is different for different columns. In other words, the number of the pixels in the first pixel group and the number of pixels in the second pixel group vary between the columns. The two image field blocks 14 engage into on another in the manner of fingers or the division of the two image field blocks 14 is overlapping. A straight, horizontal dividing line between the two image field blocks 14 can hereby be avoided which can cause interference extending through the image center due to two differently bright image field blocks 14.

Figure 8:
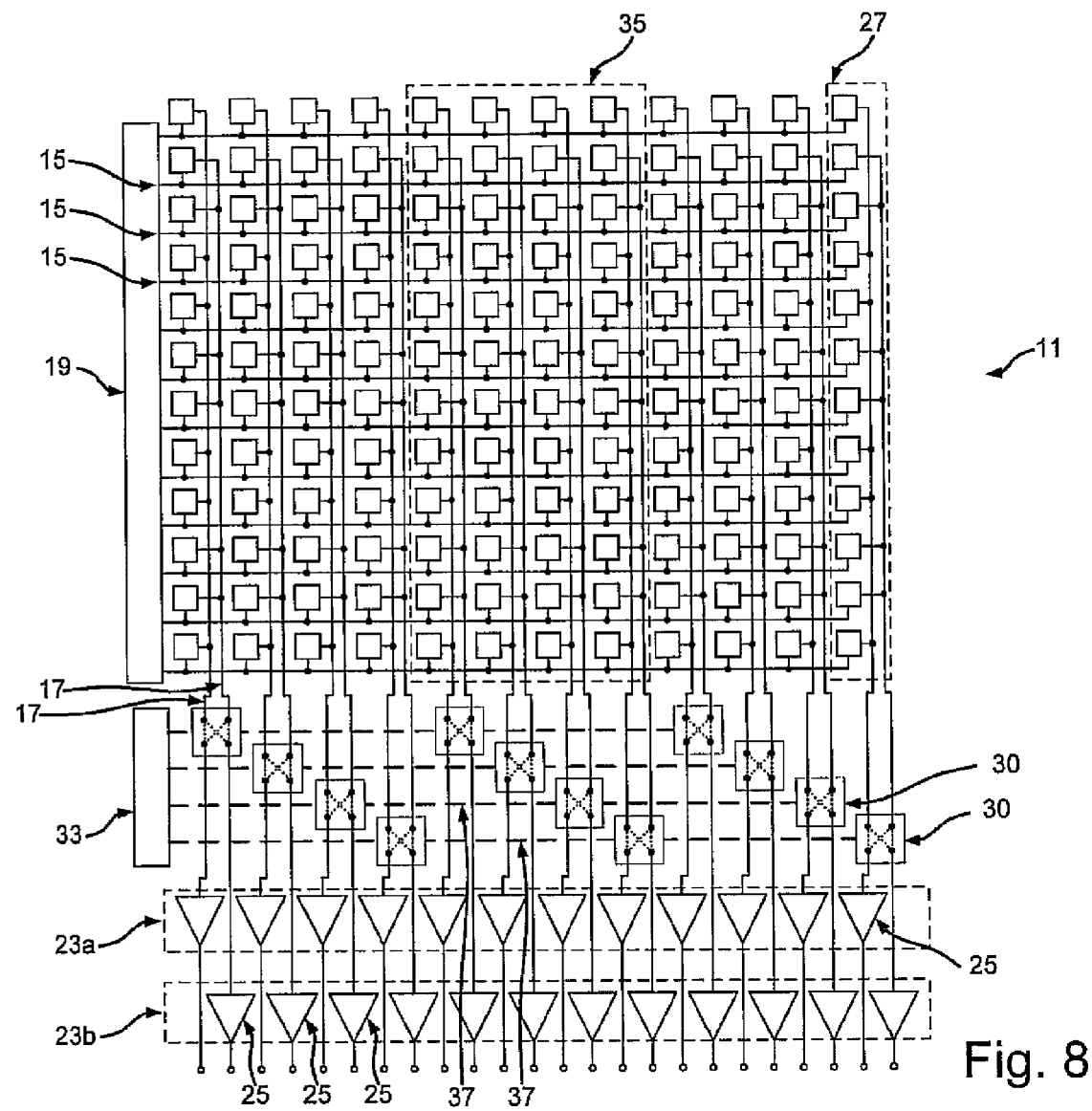
FIG. 8 an image sensor in accordance with a seventh embodiment in accordance with the invention.

In the image sensor in accordance with FIG. 8, the first row 23a of column amplifiers 25 and the second row 23b of column amplifiers 25 are arranged on the same side of the image field 11. The image field 11 is therefore only read out in one direction. The operation of the image sensor in accordance with FIG. 8 takes place in accordance with the operation of the lower image field block 14 and/or of the upper image field block 14 of the image sensor of FIG. 6.

Generally—as already mentioned in connection with FIG. 3—more than two column lines per column can also be provided, for example four column lines per column. A column line group can in particular include four column lines, for example. A switching device can then include one or more intermediate switches and/or changeover switches per column or column line group between the image field and the rows of column amplifiers, in particular arranged at the same side of the image field or at oppositely disposed sides, in order to switch each of the column lines of the respective column line group to a separate one of the rows of column amplifiers, with the number of rows of column amplifiers corresponding to the number of column lines per column or column line group. An intermediate switch, changeover switch and/or multiplexer can be provided at each amplifier and distributes four column lines over the plurality of rows, in particular four rows, of column amplifiers.

The image quality of an image sensor perceived by an eye can be considerably increased by the present invention.

The invention claimed is:

1. An image sensor for electronic cameras,
   having an image field (11) with at least one image field block (11, 14) which includes a plurality of light sensitive pixels (13) arranged in rows and columns for generating exposure dependent pixel signals, wherein the pixel signals of the pixels (13) of the respective column of the respective image field block (11, 14) can be read out via one or more respective column lines (17) extending parallel to one another; and
   having at least one first row (21) of column amplifiers (25) and at least one further row (23) of column amplifiers (25) for the respective image field block (11, 14),
   wherein the image sensor is adapted to read out the pixel signals of the pixels (13) of the respective column of the respective image field block (11, 14) of an image or of two mutually following images partly via the at least one first row (21; 21a, 23a) of column amplifiers (25) and partly via the at least one second row (23; 21b, 23b) of column amplifiers (25);
   wherein the image sensor has a switching device (29) which is adapted, for reading out the pixel signals of the pixels (13) of the respective column of the respective image field block (11, 14), to switch the respective column line (17) selectively to either one of the at least one first row (21; 21a, 23a) of column amplifiers (25) or the at least one second row (23; 21b, 23b) of column amplifiers (25);
   wherein the image sensor furthermore has a control device (33) for controlling the switching device (29); and
   wherein the column lines (17) are divided into a plurality of column line groups (27), with the respective column line group (27) including a plurality of column lines (17), with each of the column lines (17) of a respective column line group (27) being switchable to the at least one first row (21; 21a, 23a) or to the at least one second row (23; 21b, 23b) of column amplifiers (25).

2. An image sensor in accordance with claim 1,
   wherein the column lines (17) are divided into a plurality of column line units (35), with the respective column line unit (35) including the column lines (17) of a plurality of columns of pixels (13); and
   wherein the control device (33) is adapted to provide a connection association for each column line unit (35) in accordance with which the column lines (17) of the respective column line unit (35) are selectively switched to the at least one first row (21) or to the at least one second row (23) of column amplifiers (25).

3. An image sensor in accordance with claim 2,
   wherein the control device (33) includes a plurality of control lines (37), with each control line (37) being associated with a respective column line (17) of each column line unit (35) or with a respective group (27) of column lines (17) of each column line unit (35).

4. An image sensor in accordance with claim 3,
   wherein the switching unit device (29) includes a plurality of changeover switches (29-1, 29-2), with a respective subset of said plurality of changeover switches (29-1, 29-2) being associated with each column line unit (35) to switch a respective column line (17) of the respective column line unit (35) selectively to the at least one first row (21) or to the at least one second row (23) of column amplifiers (25); and
   wherein each control line is connected to a respective changeover switch (29-1, 29-2) of each column line unit (35) to control the respective changeover switch (29-1, 29-2).

5. An image sensor in accordance with claim 2,
   wherein the connection associations of the plurality of column line units (35) are identical.

6. An image sensor in accordance with claim 2,
   wherein the control device (33) is adapted to control the switching device (29) such that the connection association of the column lines (17) to the at least one first row (21) and to the at least one second row (23) of column amplifiers (25) varies from one image to the next image.

7. An image sensor in accordance with claim 2,
   wherein the control device (33) is adapted to control the switching device (29) such that the connection association of the column lines (17) to the at least one first row (21) and to the at least one second row (23) of column amplifiers (25) varies from one row to the next row of pixels (13).

8. An image sensor in accordance with claim 2,
   wherein the control device (33) is adapted to select a respective one of a plurality of predefined possible connection associations of the column lines (17) to the rows (21, 23; 21a, 21b, 23a, 23b) and to control the switching device (29) for a respective row of pixels in accordance with the selected one of said plurality of predefined possible connection associations.

9. An image sensor in accordance with claim 1,
   wherein the control device (33) is adapted to control the switching device (29) such that each of the column lines of the respective column line group is switched to a different one of the at least one first row (21; 21a, 23a) and the at least one second row (23; 21b, 23b) of column amplifiers (25).

10. An image sensor in accordance with claim 1,
wherein each column line group (27) forms at least one column line pair which includes two column lines (17); and
wherein the control device (33) is adapted to control the switching device (29) such that one of the two column lines (17) of a respective column line pair (27) is switched to the at least one first row (21; 21a, 23b) of column amplifiers (25) and the other of the two column lines (17) of the respective column line pair (27) is switched to the at least one second row (23; 21b, 23b) of column amplifiers (25).

11. An image sensor in accordance with claim 1,
wherein the column lines (17) of the respective column line group (27) are column lines (17) of a single column or are column lines (17) of different columns.

12. An image sensor in accordance with claim 1,
wherein the at least one first row (21) of column amplifiers (25) and the at least one second row (23) of column amplifiers (25) are arranged on oppositely disposed sides of the image field (11); and
wherein the switching device (29) for each column line group (27) includes a first changeover switch (29-1) arranged between the image field (11) and the at least one first row (21) of column amplifiers (25) and a second changeover switch (29-2) arranged between the image field (11) and the at least one second row (23) of column amplifiers (25) to switch each of the column lines (17) of the respective column line group (27) to a different one of the at least one first row (21; 21a, 23a) and the at least one second row (23; 21b, 23b) of column amplifiers (25).

13. An image sensor in accordance with claim 1,
wherein the at least one first row (21) of column amplifiers (25) and the at least one second row (23) of column amplifiers (25) are arranged on the same side of the image field (11); and
wherein the switching device (29) for each column line group (27) includes an intermediate switch (30) arranged between the image field (11) and the rows (21, 23a, 21b, 23b) of column amplifiers (25) to switch each of the column lines (17) of the respective column line group (27) to a different one of the at least one first row (21; 21a, 23a) and of the at least one second row (23; 21b, 23b) of column amplifiers (25).

14. An image sensor in accordance with claim 1,
wherein a separate column amplifier (25) from the at least one first row (21; 21a, 23a) of column amplifiers (25) and a separate column amplifiers (25) from the at least one second row (23; 21b, 23b) of column amplifiers (25) are associated with the respective column line group (27).

15. An image sensor in accordance with claim 1,
wherein the column lines (17) are divided into a plurality of column line units (35), with the respective column line unit (35) including a plurality of column line groups (27); and
wherein the control device (33) is adapted to provide a connection association for each column line unit (35) in accordance with which the column lines (17) of the respective column line unit (35) are selectively switched to the at least one first row (21) or to the at least one second row (23) of column amplifiers (25).

16. An image sensor in accordance with claim 15,
wherein the control device (33) includes a plurality of control lines (37), with each control line (37) being associated with a respective column line group (27) from each column line unit (35).

17. An image sensor in accordance with claim 1,
wherein the image sensor for each column of pixels (13) has a plurality of column lines (17), with each pixel (13) of the respective column only being connected or connectable to one of the plurality of column lines (17), with the column lines (17) being connected to the at least one first row (21) or to the at least one second row (23) of column amplifiers (25) in accordance with a fixedly predefined connection association.

18. An image sensor in accordance with claim 17,
wherein the pixels (13) of the respective column are associated randomly, quasi-randomly or alternatingly with the at least one first row (21) or with the at least one second row (23) of column amplifiers (25).

19. An image sensor in accordance with claim 17,
wherein the column lines (17) are divided into a plurality of column line groups (27), with the column lines (17) of the respective column line group (27) being column lines (17) of a single column, and with the connection association of the column lines (17) varying from one column line group (27) to the next column line group (27) or from one column to the next column.

20. An image sensor for electronic cameras, comprising:
an image field (11) which has a plurality of light sensitive pixels (13) arranged in rows and columns for generating exposure dependent pixel signals;
a plurality of column lines (17) for each column of pixels (13), with each pixel (13) of the respective column only being connected or connectable to one of the plurality of column lines (17);
at least one first row (21) of column amplifiers (25) and at least one second row (23) of column amplifiers (25) which are arranged on oppositely disposed sides of the image field (11); and
a switching device (29) which is adapted, for reading out the pixel signals of the pixels (13) of a respective column, to switch the respective column line (17) selectively to the at least one first row (21) or to the at least one second row (23) of column amplifiers (25).

21. An image sensor in accordance with claim 20,
wherein the image sensor furthermore has a control device (33) for controlling the switching device (29);
wherein the column lines (17) are divided into a plurality of column line units (35), each column line unit (35) including the column lines (17) of a plurality of columns of pixels (13); and
wherein the control device (33) is adapted to provide a connection association for each column line unit (35) in accordance with which the column lines (17) of the respective column line unit (35) are selectively switched to the at least one first row (21) or to the at least one second row (23) of column amplifiers (25).

22. An image sensor in accordance with claim 21,
wherein the control device (33) includes a plurality of control lines (37), with each control line (37) being associated with a respective column line (17) of each column line unit (35) or with a respective group (27) of column lines (17) of each column line unit (35).

23. An image sensor in accordance with claim 22,
wherein the switching device (29) has a plurality of changeover switches (29-1, 29-2), with a respective subset of said plurality of changeover switches (29-1, 29-2) being associated with each column line unit (35) to switch a respective column line (17) of the respective column line unit (35) selectively to the at least one first row (21) or to the at least one second row (23) of column amplifiers (25); and wherein each control line is connected to a respective changeover switch (29-1, 29-2) of each column line unit (35) to control the respective changeover switch (29-1, 29-2).

24. An image sensor in accordance with claim 21,
wherein the connection associations of the plurality of column line units (35) are identical.

25. An image sensor in accordance with claim 21,
wherein the control device (33) is adapted to control the switching device (29) such that the connection association of the column lines (17) to the at least one first row (21) and to the at least one second row (23) of column amplifiers (25) varies from one row to the next row of pixels.

26. An image sensor in accordance with claim 20,
wherein the switch device (29) is adapted to read out the pixel signals of the pixels (13) of a respective column of an image or of two mutually following images partly via the at least one first row (21; 21a, 23a) of column amplifiers (25) and partly via the at least one second row (23; 21b, 23b) of column amplifiers (25).

27. An image sensor for electronic cameras,
having an image field which includes a plurality of light sensitive pixels arranged in rows and columns for generating exposure dependent pixel signals, wherein the pixel signals of the pixels of the respective column can be read out via one or more respective column lines extending parallel to one another, wherein each pixel is connected or connectable to one of the column lines; and having at least one first row of column amplifiers and at least one further row of column amplifiers;

wherein the image sensor is adapted to read out the pixel signals of the pixels of the respective column of an image or of two mutually following images partly via the at least one first row of column amplifiers and partly via the at least one second row of column amplifiers;

wherein the image sensor has a switching device which is adapted, for reading out the pixel signals of the pixels of the respective column, to switch the respective column line selectively to either one of the at least one first row of column amplifiers or the at least one second row of column amplifiers; and wherein the image sensor furthermore has a control device for controlling the switching device.

28. An image sensor in accordance with claim 27,
wherein the switching device is arranged between the column lines and the rows of column amplifiers.

29. An image sensor in accordance with claim 27,
wherein each column line extends along the image field without interruption.

30. An image sensor in accordance with claim 27,
wherein the image sensor for each column of pixels comprises a plurality of column lines, wherein each pixel of a respective column is connected or connectable to only one of the plurality of column lines of the respective column.

* * * * *